April 12, 1960 D. RINKEMA 2,932,202
POWER TAKE-OFF MECHANISM
Filed Dec. 30, 1957 2 Sheets-Sheet 1

Inventor
David Rinkema
by James O. Olson
Attorney

April 12, 1960      D. RINKEMA      2,932,202
POWER TAKE-OFF MECHANISM

Filed Dec. 30, 1957      2 Sheets-Sheet 2

Inventor
David Rinkema
By James C. Alfson
Attorney

United States Patent Office 2,932,202
Patented Apr. 12, 1960

2,932,202

POWER TAKE-OFF MECHANISM

David Rinkema, Springfield, Ill., assignor to Allis-Chalmers Manufacturing Company, Milwaukee, Wis.

Application December 30, 1957, Serial No. 705,961

15 Claims. (Cl. 74—15.86)

This invention relates to motor vehicles of the type having an engine for driving ground engaging traction elements and is more particularly concerned with a transmission and power take-off mechanism for said vehicles.

In providing motor vehicles for industrial uses that meet present day requirements it is desirable to equip such vehicles with transmissions of the quick shift constant mesh type which permits a change from one speed ratio to another without stopping the vehicle or actuating a master clutch. In line with present day trends such quick shift transmissions are actuated by hydraulically operated clutch mechanisms. The pressurized fluid for actuating the hydraulic clutches is supplied by a hydraulic system including a pump which is usually driven by a live power take-off and may be operated continuously as long as the vehicle's engine is running. The adaptation of this type of quick shift transmission to a crawler tractor applicator has confronted the industry with a number of problems. As an example, in the course of every day operation it is oftentimes necessary to start the engine of a crawler tractor by towing the vehicle. It is obvious that the tractor when being towed cannot be started unless the transmission is in gear. It is equally obvious that a transmission actuated by hydraulic clutches cannot be shifted into gear unless sufficient pressurized fluid is available in order to actuate the clutches. Heretofore, it has been suggested that the tractor be provided with two pumps, one being driven by the engine whereby pressurized fluid may be provided when the engine is operating and the other being ground driven whereby pressurized fluid may be provided to shift the clutches when the tractor is being towed in order to start the engine. Such a solution to the problem, however, is unsatisfactory from the standpoint that two pumps with drives cost twice as much and occupy twice as much space as one pump does; and furthermore, the ground pump is unnecessary when the engine is running.

It is, therefore, an object of the present invention to provide a power take-off mechanism which will overcome the difficulties and disadvantages hereinbefore described.

It is a more specific object of this invention to provide a transmission and power take-off mechanism whereby a power consuming unit may be driven selectively either from the ground or from the engine.

It is a further object of this invention to provide a power take-off mechanism for driving a hydraulic pump whereby torque may be imparted to the pump shaft from either the engine or alternatively from the ground engaging traction elements of the motor vehicle.

Still another object of this invention is to provide an improved transmission and power take-off mechanism wherein a drive shaft for driving a power consuming unit may be selectively connected to an engine driven element whereby torque may be imparted to the drive shaft directly from the engine, and alternatively the transmission output shaft may be selectively connected to the drive shaft whereby torque may be imparted to the latter from the traction elements of the vehicle.

These and other objects and advantages will be apparent to those skilled in the art when the following specification is read in conjunction with the accompanying drawings wherein.

Figure 3:
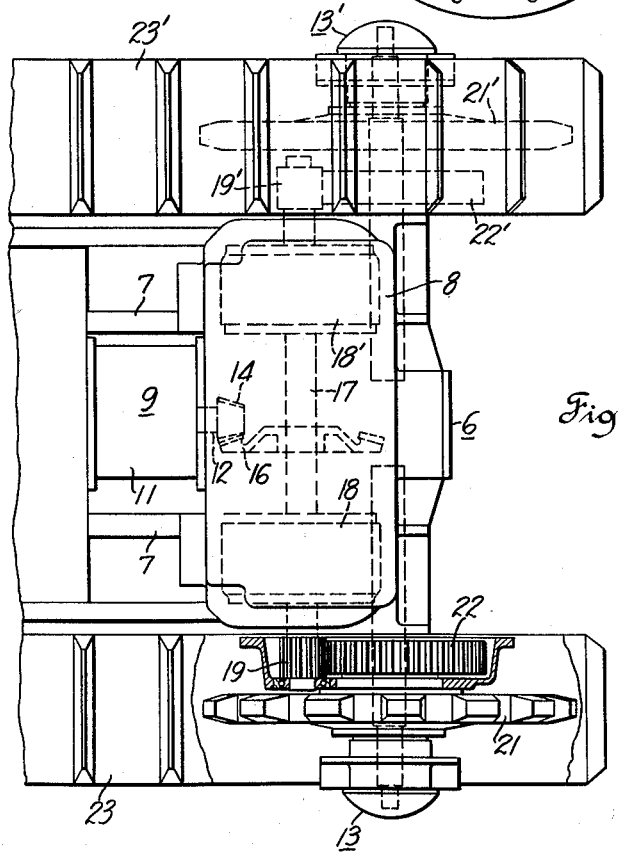
Fig. 3 is the top elevation of a crawler tractor rear end showing the final drive assembly by hidden lines.

Referring to Fig. 3, the crawler tractor 6 of which only the rear portion is shown is of the conventional type. Since the construction of a crawler tractor is well known and understood, it is believed necessary only to identify those portions which are believed necessary in order to illustrate the present invention. Reference character 7 indicates a longitudinally extending main frame having a rear portion on which the transversely extending final drive housing 8 is rigidly connected. A transmission and power take-off mechanism 9 whose character and function will be further described below includes a support housing indicated generally by the reference character 11, which is fixedly attached at its rearward portion on the final drive housing 8 and at its forward portion fixedly connected on a main frame 7 which connection is not shown.

Power is transmitted from the output shaft 12 of the transmission to the pair of ground engaging traction elements indicated generally by the reference characters 13 and 13' at opposite sides, respectively, of the main frame 7 through a bevel gear 14 carried on shaft 12 which is intermeshed with a bevel gear 16 which is carried on a cross shaft 17 thence simultaneously through the steering clutches 18 and 18' to the final drive pinions 19 and 19' which are permanently geared to the track belt drive sprockets 21 and 21' respectively through suitable gearing as indicated at 22 and 22' which in turn drives the endless track belts 23 and 23' which are mounted for travel around a pair of track frames by means of track rollers and front idlers which are not shown.

Figure 1:
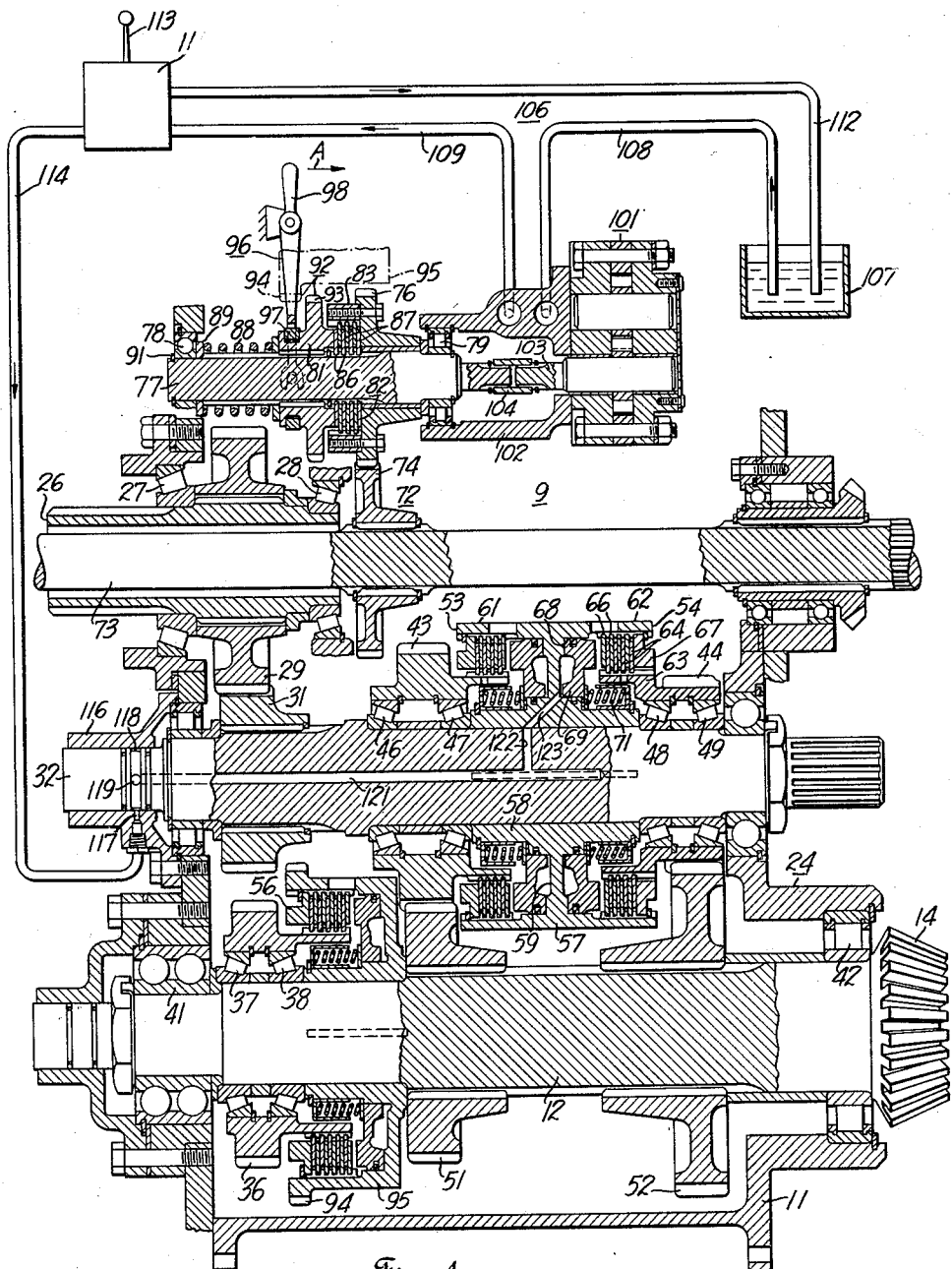
Fig. 1 is a development view of a transmission and power take-off mechanism in vertical longitudinal section taken along lines I—I in Fig. 2. Also shown is a hydraulic pump for supplying hydraulic fluid to a schematically illustrated hydraulic system.
Figure 2:
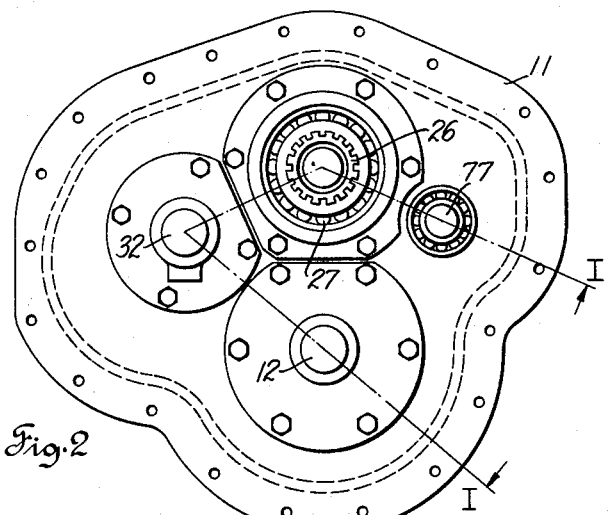
Fig. 2 is the end view of the transmission and power take-off mechanism.

Referring to Figs. 1 and 2, the power transmission 24 of the transmission and power take-off mechanism is of the constant mesh quick shift type that may be driven off a torque converter. Transmission 24 is designed to provide two forward and one reverse torque converter driven tractor speed ranges and includes a hollow input shaft 26 which is journaled on suitable bearings 27 and 28 on support housing 11 and is to be connected in driven relation to the turbine or runner of a conventional torque converter not shown. An input gear 29 is splined on shaft 26 and in constant mesh with a driven gear 31 which is splined on the countershaft 32 which is journaled on suitable bearings in the support housing 11. The input gear 29 is also in constant mesh with a reverse gear 36 which is rotatably mounted on bearings 37 and 38 on the transmission output or power shaft 12 (also shown in Fig. 3) which is journaled on bearings 41 and 42 in the support housing 11. Driving gears 43 and 44 are rotatably mounted respectively on bearings 46, 47 and 48, 49 on countershaft 32. Gears 43 and 44 are in constant mesh respectively with driven gears 51 and 52 which are splined on the output shaft 12. A pair of multiple disk clutch mechanisms 53 and 54 are interposed respectively between gears 43 and 44 and countershaft 32 for controlling the two forward speed ratios. A multiple disk clutch mechanism 56 is interposed between reverse gear 36 and output shaft 12 for controlling the reverse drive. The clutch mechanisms 53, 54 and 56 are hydraulically actuated and of conventional type and design. Clutches 53 and 54 have a common driving drum 57 keyed onto shaft 32 which includes a hub 58, a web portion 59 and a radially disposed and axially extending flange portion 61 associated with clutch 53 and a flange portion 62 associated with clutch 54. The driven drum of clutch 54 is formed by an axially extending flange 63 which is fixedly attached on gear 44. A circumferential series of axially extending outer keys or splines are formed on flange 63 and the latter is surrounded by a stack of clutch disks comprising a number of metallic internally toothed disks 64 which are engaged by and in driven relation to the keys or splines of the driven flange 63 and which are in driven relation to a number of externally toothed friction disks 66 which are drivingly engaged at their outer peripheries by internal axially extending keys or splines of flange 62 of the driving drum and alternate with the metallic driven disks 64. An annular radial flange member is carried on the driving drum and serves as an axial abutment 67 for the stacked clutch disks. A hydraulic cylinder 68 is formed in the hub 58. A piston 69 which is axially slidable within cylinder 68 serves as a thrust plate for exerting pressure upon the stacked clutch disks 64 and 66 in an axial direction toward the abutment 67 whereby the disks are moved into torque transmitting frictional engagement with each other. A series of radially disposed axially acting springs 71 are interposed between the hub 58 and the piston 69 for exerting a force in an axial direction biasing the piston out of engagement with the disks whereby clutch 54 is maintained in the disengaged position. Clutches 53 and 56 are constructed similarly to clutch 54 and it is not believed necessary to specifically identify their components.

Torque may be transmitted from the tractor's engine to the bevel pinion 14 of output shaft 12 of the transmission 24 as follows: the propeller shaft of the engine is to be coupled with the impeller or pump of a torque converter, thence through the hydraulic medium of the torque converter to the turbine or runner, none of which is shown, and then to the input shaft 26 of the transmission. Torque is then transmitted to the countershaft through gears 29 and 31 and thence to the output shaft 12 through gears 43 and 51 by actuating clutch 53 or through gears 44 and 52 by actuating clutch 54. To obtain a reverse drive, clutch 56 may be actuated whereby torque is thence transmitted from the input shaft 26 directly to the output shaft 12 through gears 29 and 36. From the foregoing it will be seen that the driving gear 29, the driven gear 31, countershaft 32, gears 43 and 44, clutches 53, 54 and 56 and gears 51 and 52 comprise a change speed gear mechanism for selectively interconnecting the input and output shafts.

The power take-off mechanism 72 includes a power take-off shaft 73 which may be coupled to the engine propeller shaft which also drives the impeller of the torque converter. Power take-off shaft 73 is piloted through the hollow input shaft 26 and is journaled on suitable bearings in the support housing 11. A driving power take-off gear 74 is splined on shaft 73 and in constant mesh with a driven gear which is rotatably mounted on a drive shaft 77 which is journaled on bearings 78, 79 in the housing 11. Drive shaft 77 is provided with a series of circumferentially spaced axially extending splines or keys on which a collar member 81 is nonrotatably mounted and axially slidable. A multiple disk clutch mechanism 82 (also referred to herein as a first clutch mechanism) is interposed between gear 76 and shaft 77. Clutch 82 includes a radially disposed axially extending driving drum 83 which is bolted onto gear 76 for rotation therewith. A splined portion of shaft 77 serves as a driven drum. The driven drum portion of shaft 77 is surrounded by a stack of clutch disks comprising a number of internally toothed disks 86 which are engaged by the splines of shaft 77 in driving relationship to the latter and frictionally engaged in driven relationship by a number of externally toothed friction disks 87 which are engaged at their outer peripheries by internal axially extending keys or splines of the driving drum 83 in driven relation to the latter, and alternate with the disks 86. The radially disposed web portion of gear 76 serves as an axial abutment for the stacked clutch disks 86 and 87 and collar member 81 serves as a thrust plate for exerting axial pressure upon the stacked disks 86 and 87 for moving the latter in an axial direction towards gear 76. A pressure means in the form of a coiled spring 88 is carried on shaft 77 and operatively interposed between an abutment washer 89 which is held against axial movement by the inner bearing raceway of bearing 78 which in turn abuts a snap ring 91 that is locked on shaft 77 and collar member 81 whereby the latter is urged axially in a direction towards the gear 76 thereby maintaining the disks 86 and 87 in torque transmitting frictional engagement. A clash type gear arrangement comprises a second clutch mechanism 92 and includes gear teeth 93 on the collar member 81 as one clutch member and gear teeth 94 on the driven drum 95 of the reverse clutch, which is nonrotatably keyed on the output shaft 12, as the other mating clutch member. To engage the second clutch mechanism it is necessary to move the collar member axially to the left against the force of spring 88 whereby the gear teeth 93 will become meshed in driven relationship with the gear teeth 94 which rotate with the output shaft 12.

An actuating means 96 is illustrated diagrammatically to illustrate the actuation of the clutches. The actuating means 96 include a throwout bearing and yoke assembly 97 which is mounted on the collar member 81 and a manually actuated lever 98 which is pivotally mounted intermediate its opposite ends on a support which is fixedly mounted with respect to housing 11. Lever 98 has a forked end connected in thrust transmitting relation with the yoke assembly 97. When the hand lever 98 is shifted in a direction indicated by arrow A to an intermediate position, the collar member 81 will be moved axially to the left against the pressure of spring 88 and the clutch mechanism 82 will be disengaged. This is the neutral position as shown in Fig. 1. Additional movement of the hand lever in the direction of arrow A will move the gear portion 93 of the collar member into mesh with the gear portion 94. It is contemplated that a suitable lock or detent mechanism may be provided whereby the collar member 81 is maintained in either an engaged position of clutch mechanism 92, a neutral position or an engaged position of clutch 82.

A conventional gear type hydraulic pump 101 has a casing 102 which is to be fixedly attached on the support 11. A pump shaft 103 is coupled in driven relationship with drive shaft 77 as by an internally splined sleeve 104 in which the externally splined ends of shafts 77 and 103 are carried respectively.

Pump 101 is a component of the hydraulic system, the latter being indicated generally by the reference character 106 for supplying pressurized hydraulic fluid to actuate the hydraulic clutches 53, 54 and 56 of the transmission. The pump 101 draws hydraulic fluid from a reservoir 107 through an intake conduit 108 and expels pressurized hydraulic fluid through the outlet conduit 109 to a suitable control valve assembly 111 for actuating clutch 54. The control valve 111 contains a suitable bypass mechanism, not shown, whereby hydraulic fluid is returned to the reservoir 107 through a return conduit 112 when it is not needed. Upon shifting the actuating lever 113 of valve 111 to a predetermined position pressurized fluid may be transmitted through conduit 114 which is connected to a nonrotatable collar 116 which fits about one end of shaft 32 and is delivered through an opening 117 to chamber 118 formed by a peripheral groove in shaft 32 and thence through a radial opening 119 and longitudinally extending opening 121 in shaft 32 and thence through openings 122 and 123 to cylinder 68 causing piston 69 to be moved in an axial direction to engage clutch disks 64 and 66. It is to be understood that clutches 53 and 56 are similarly actuated although the details of such operation have not been illustrated.

Operation

During the normal operation of the power take-off mechanism, driving gear 74, driven gear 76, clutch mechanism 82 including collar member 81, drive shaft 77 and sleeve 104 comprise a means for selectively connecting the power take-off shaft 73 in driving relation to the pump shaft 103 whereby torque may be imparted to the latter directly from the engine. The pump 101 in turn is thus able to supply pressurized fluid with which to actuate the hydraulic clutches of the transmission. In a broader sense driving gear 74, driven gear 76 and clutch mechanism 82 including collar 81 comprise a means for selectively connecting the power take-off shaft 73 in driving relation to the drive shaft 77 which may also be described as a drive member for driving a power consuming unit, whereby torque may be imparted to the drive member 77 directly from the engine. Although a power take-off shaft together with a driving gear splined thereon has been selected for purposes of illustrating the invention, it is not intended to so limit the invention. The invention contemplates a means for connecting a drive member and an engine driven element whereby an engine drive is obtained. The engine driven element may be a power take-off shaft, a power take-off gear mounted upon the input shaft of the transmission or any other suitable engine driven shaft or gear of the transmission.

During such times when it becomes necessary to tow the tractor in order to start the engine, the collar member 81 is moved to the left to disengage clutch 82 and engage the second clutch mechanism 92 in order to provide a ground drive from the traction elements 13, 13' through the final drive and thence to the output shaft 12. In this condition drum 95 with gear 94, collar member 81 with gear 93 and drive shaft 77 comprise a means for connecting the output shaft 12 in driving relation to the pump shaft 103 whereby torque may be imparted to the latter from the ground engaging traction elements 13, 13'.

It will be readily understood that as the tractor is being towed and the endless track belts 23, 23' of the traction elements 13, 13' (shown in Fig. 3) are being rotated the pump will be operative to supply hydraulic fluid with which to actuate the hydraulic clutch 54 whereby torque from the ground engaging traction elements will be transmitted to the output shaft 12 through the final drive and bevel gears 14 and 16 and thence to the countershaft 32 through gears 52 and 44, then to the input shaft 26 through gears 31 and 29 and thence to the engine propeller shaft through the torque converter, a suitable means being provided to lock the turbine or runner shaft of the torque converter to the impeller shaft. In this condition the engine would now be turning over and the tractor may be started. As soon as the engine starts, the actuating means 96 may be shifted so as to move collar member 81 to the right engaging clutch 82 thereby effectively connecting the engine in driving relation to the pump 101.

From the foregoing detailed description it will be readily seen that a novel construction has been illustrated for driving a hydraulic pump by either a ground drive or an engine drive in order to supply pressurized fluid for actuating the hydraulic clutches of a quick shift transmission. It is not intended, however, to limit the invention to the combination of a quick shift countershaft type transmission nor to a transmission driven through a torque converter. Further, it is not intended to limit the invention to driving of a hydraulic pump for actuating the clutches of the transmission as many other auxiliary power take-off actuated mechanisms on a motor vehicle require alternative actuation from either an engine or ground drive. For example, the present invention counld be incorporated into a crawler tractor equipped with hydraulically actuated steering clutches of the type shown in the W. H. Bruce et al patent U.S. 2,444,279 which clutches are not releasable unless pressurized hydraulic fluid is available. In order to steer a crawler tractor so equipped while it is being towed, upon failure of the engine, pressurized fluid may be furnished by a ground drive to the hydraulic pump as disclosed in the present invention.

It should be understood further that it is not intended to limit the patent granted hereon other than is necessitated by the scope of the claims.

What is claimed is:

1. The combination of a power take-off and transmission mechanism with a motor vehicle of the type having an engine for driving ground engaging traction elements, said combination comprising: a change speed transmission having a power input shaft and a variable speed output shaft, said output shaft being connected in torque transmitting relationship with the traction elements of the motor vehicle; a change speed gear mechanism including control means for selectively connecting said input and output shafts; an engine driven power take-off element; a drive member for driving a power consuming unit; means including a first clutch mechanism for selectively connecting said power take-off element in driving relation to said drive member whereby torque may be imparted to the latter from the engine; and means including a second clutch mechanism for alternatively connecting said output shaft in driving relation to said drive member whereby torque may be imparted to the latter from a traction element of the motor vehicle upon release of said first clutch mechanism.

2. The combination of a power take-off and transmission mechanism with a motor vehicle of the type having an engine for driving ground engaging traction elements, said combination comprising: a power input shaft; a variable speed output shaft in torque transmitting relationship with the traction elements of the motor vehicle; a change speed gear mechanism including control means for selectively interconnecting said input and output shafts; an engine driven power take-off shaft having a driving gear nonrotatably mounted thereon; a drive shaft for driving a power consuming unit; means including a driven gear in mesh with said driving gear and carried on said drive shaft, said means also including a first clutch mechanism for selectively connecting said driving gear in driving relation to said drive shaft; means including a second clutch mechanism for selectively connecting said output shaft in driving relation to said drive shaft whereby torque may be imparted to the latter from a traction element of the motor vehicle upon release of said first clutch mechanism; and actuating means for releasing said first clutch mechanism.

3. The combination of a power take-off and transmission mechanism with a motor vehicle of the type having an engine for driving ground engaging traction elements, said combination comprising: a change speed transmission having a power input shaft and a variable speed output shaft, said output shaft being connected in torque transmitting relationship with the traction elements of the motor vehicle; a change speed gear mechanism including control means for selectively interconnecting said input and output shafts; an engine driven power take-off element; a drive member for driving a power consuming unit; means including a first clutch mechanism for selectively connecting said power take-off element in driving relation to said drive member; and means including a clutch member carried on said output shaft and a mating clutch member carried on said drive member for selectively connecting said output shaft in driving relation to said drive shaft whereby torque may be imparted to the latter from a traction element of the motor vehicle upon release of said first clutch mechanism.

4. The combination of a power take-off mechanism and transmission mechanism with a motor vehicle of the type having an engine for driving ground engaging traction elements, said combination comprising: a power input shaft; a variable speed output shaft in torque transmitting relationship with the traction elements of the motor vehicle; a change speed gear mechanism including control means for selectively interconnecting said input and output shafts; an engine driven power take-off shaft having a driving gear nonrotatably mounted thereon; a drive shaft for driving a power consuming unit; means including a driven gear in mesh with said driving gear and carried on said drive shaft, said means also including a first clutch mechanism for selectively interconnecting said power take-off shaft in driving relation to said drive shaft; means including a clutch member carried on said output shaft and a mating clutch member carried on said drive shaft for selectively connecting said output shaft in driving relation to said drive shaft whereby torque may be imparted to the latter from a traction element of the motor vehicle upon release of said first clutch mechanism; and actuating means for selectively releasing said first clutch mechanism and alternatively engaging said clutch members.

5. The combination of a power take-off and transmission mechanism with a motor vehicle of the type having an engine for driving ground engaging traction elements, said combination comprising: a change speed transmission having a power input shaft and a variable speed output shaft, said output shaft being connected in torque transmitting relationship with the traction elements of the motor vehicle; a change speed gear mechanism including control means for selectively interconnecting said input and output shafts; an engine driven power take-off shaft; a drive shaft for driving a power consuming unit; means including a friction clutch mechanism carried on said drive shaft for selectively connecting the latter in driven relation to said power take-off shaft; means including a second clutch mechanism for selectively connecting said output shaft in driving relation to said drive shaft whereby torque may be imparted to the latter from one of the traction elements of the motor vehicle upon release of said friction clutch mechanism.

6. The combination of a power take-off and transmission mechanism with a motor vehicle of the type having an engine for driving ground engaging traction elements, said combination comprising: a change speed transmission having a power input shaft and a variable speed output shaft, said output shaft being connected in torque transmitting relationship with the traction elements of the motor vehicle; a change speed gear mechanism including control means for selectively connecting said input and output shafts; an engine driven power take-off shaft; a drive shaft for driving a power consuming unit; means including a friction clutch mechanism carried on said drive shaft for selectively connecting the latter in driven relation to said power take-off shaft; means including a clutch member carried on said output shaft and a mating clutch member carried on said drive shaft for selectively connecting said output shaft in driving relation to said drive shaft whereby torque may be imparted to the latter from a traction element of the motor vehicle upon release of said first clutch mechanism; and actuating means for releasing said friction clutch mechanism and alternatively engaging said clutch members.

7. The combination of a power take-off and transmission mechanism with a motor vehicle of the type having an engine for driving ground engaging traction elements, said combination comprising: a change speed transmission having a power input shaft and a variable speed output shaft, said output shaft being connected in torque transmitting relationship with the traction elements of the motor vehicle; a change speed gear mechanism including control means for selectively connecting said input and output shafts; an engine driven power take-off shaft; a drive shaft for driving a power consuming unit; means including a friction clutch mechanism carried on said drive shaft for selectively connecting the latter in driven relation to said power take-off shaft; means including a second clutch mechanism for selectively connecting said output shaft in driving relation to said drive shaft whereby torque may be imparted to the latter from a traction element of the motor vehicle upon release of said friction clutch mechanism; a collar member carried on said drive shaft and serving as a clutch member of each of said friction clutch mechanisms and said second clutch mechanism; and actuating means for moving said collar member to release said friction clutch mechanism and alternatively engage said second clutch mechanism.

8. The combination of a power take-off and transmission mechanism with a motor vehicle of the type having an engine for driving ground engaging traction elements, said combination comprising: a change speed transmission having a power input shaft and a variable speed output shaft, said output shaft being connected in torque transmitting relationship with the traction elements of the motor vehicle; a change speed gear mechanism including control means for selectively connecting said input and output shafts; an engine driven power take-off shaft; a drive shaft for driving a power consuming unit; means including a friction clutch mechanism carried on said drive shaft for selectively connecting the latter in driven relation to said power take-off shaft; means including a second clutch mechanism for selectively connecting said output shaft in driving relation to said drive shaft whereby torque may be imparted to the latter from a traction element of the motor vehicle upon release of said friction clutch mechanism; a collar member nonrotatably mounted and axially slidable on said shaft and serving as a clutch member of each of said friction clutch mechanisms and said second clutch mechanism; and actuating means for moving said collar member in one axial direction to release said first clutch mechanism and alternatively engage said second clutch mechanism.

9. The combination of a power take-off and transmission mechanism with a motor vehicle of the type having an engine for driving ground engaging traction elements, said combination comprising: a change speed transmission having a power input shaft and a variable speed output shaft, said output shaft being connected in torque transmitting relationship with the traction elements of the motor vehicle; a change speed gear mechanism including control means for selectively connecting said input and output shafts; an engine driven power take-off shaft; a drive shaft for driving a power consuming unit; means including a friction clutch mechanism carried on said drive shaft for selectively connecting the latter in driven relation to said power take-off shaft; means including a second clutch mechanism for selectively connecting said output shaft in driving relation to said drive shaft whereby torque may be imparted to the latter from one of the traction elements of the motor vehicle upon release of said friction clutch mechanism; a collar member nonrotatably mounted and axially slidable on said drive shaft and serving as a clutch member of each of said friction clutch mechanisms and second clutch mechanism; and actuating means for maintaining said collar member in a neutral position wherein no torque may be imparted to said drive shaft, for moving said collar member from said neutral position in one axial direction to engage said friction clutch means, and for alternatively moving said collar member out of said neutral position in an opposite axial direction to engage said second clutch means.

10. The combination of a power take-off and transmission mechanism with a motor vehicle of the type having an engnine for driving ground engaging traction elements, said combination comprising: a constant mesh change speed transmission having a power input shaft and a variable speed output shaft, said output shaft being connected in torque transmitting relationship with the traction elements of the motor vehicle; a change speed gear mechanism including friction devices for selectively interconnecting said input and output shafts; a hydraulic system including a pump for supplying pressurized fluid; a pump shaft for driving said pump; an engine driven power take-off element; a means including a first clutch mechanism for selectively connecting said power take-off element in driving relation to said pump shaft; means including a second clutch mechanism for alternatively connecting said output shaft in driving relation to said pump shaft whereby torque may be imparted to the latter from a traction element of the motor vehicle upon release of said first clutch mechanism.

11. The combination of a power take-off and transmission mechanism with a motor vehicle of the type having an engine for driving ground engaging traction elements, said combination comprising: a constant mesh change speed transmission having a power input shaft and a variable speed output shaft, said output shaft being connected in torque transmitting relationship with the traction elements of the motor vehicle; a change speed gear mechanism including hydraulic actuated friction devices for selectively interconnecting said input and output shafts; a hydraulic system including a pump unit for supplying pressurized fluid to actuate said friction devices; a pump shaft for driving said pump; an engine driven power take-off element; means including a first clutch mechanism for selectively connecting said power take-off element in driving relation to said pump shaft; means including a second clutch mechanism for alternatively connecting said output shaft in driving relation to said pump shaft whereby torque may be imparted to the latter from a traction element of the motor vehicle upon release of said first clutch mechanism.

12. The combination of a power take-off and transmission mechanism with a motor vehicle of the type having an engine for driving ground engaging traction elements, said combination comprising: a constant mesh change speed transmission having a power input shaft and a variable speed output shaft, said output shaft being connected in torque transmitting relationship with the traction elements of the motor vehicle; a change speed gear mechanism including a hydraulically actuated multiple disk clutch for selectively interconnecting said input and output shafts; a hydraulic system including a pump for supplying pressurized fluid to actuate said disk clutch; a pump shaft for driving said pump; an engine driven power take-off shaft; means including a drive shaft and a first clutch mechanism for selectively connecting said power take-off shaft in driving relation to said pump shaft; means including said drive shaft and a second clutch mechanism for alternatively connecting said output shaft in driving relation to said pump shaft; a collar member nonrotatably mounted and axially slidable on said drive shaft, said collar member serving as a clutch member for said first and second clutch mechanisms, respectively; actuating means for sliding said collar member in one axial direction to engage said first clutch mechanism whereby torque may be imparted to said drive shaft from the engine, and for alternatively sliding said collar member in an opposite axial direction to release said first clutch mechanism and engage said second clutch mechanism whereby torque may be imparted to said drive shaft from a traction element of the motor vehicle.

13. The combination of a power take-off and transmission mechanism with a motor vehicle of the type having an engine for driving ground engaging traction elements, said combination comprising: a constant mesh change speed transmission having a power input shaft and a variable speed output shaft, said output shaft being connected in torque transmitting relationship with the traction elements of the motor vehicle; a change speed gear mechanism including a hydraulic actuated multiple disk clutch for selectively interconnecting said input and output shafts; a hydraulic system including a pump for supplying pressurized fluid to actuate said disk clutch; a pump shaft for driving said pump; an engine driven power take-off shaft; means including a drive shaft coupled with said pump shaft and including a clutch mechanism for selectively connecting said power take-off shaft in driving relation to said pump shaft whereby torque may be imparted to the latter from the engine; a driving gear member nonrotatably mounted on said output shaft; a driven gear member nonrotatably mounted and axially slidable on said drive shaft; and actuating means for releasing said clutch mechanism and alternatively moving said driven gear into mesh with said driving gear whereby torque may be imparted to said pump shaft from a traction element of the motor vehicle upon release of said clutch mechanism.

14. The combination of a power take-off and transmission mechanism with a motor vehicle of the type having an engine for driving ground engaging traction elements, said combination comprising: a constant mesh change speed transmission having a power input shaft and a variable speed output shaft, said output shaft being connected in torque transmitting relationship with the traction elements of the motor vehicle; a change speed gear mechanism including a hydraulic actuated multiple disk clutch for selectively interconnecting said input and output shafts; a hydraulic system including a pump for supplying pressurized fluid to actuate said disk clutch; a pump shaft for driving said pump; an engine driven power take-off shaft; means including drive shaft coupled with said pump shaft and including a clutch mechanism for selectively connecting said power take-off shaft in driving relation to said pump shaft whereby torque may be imparted to the latter from the engine; a collar member nonrotatably mounted and axially slidable on said drive shaft, said collar member having a gear portion and serving as a clutch member of said clutch mechanism; a driving gear member nonrotatably mounted on said output shaft, said gear portion on said collar member being selectively engageable with said gear member; and actuating means for shifting said collar member in one axial direction to release said clutch mechanism and alternatively urge said gear portion into mesh with said driving gear member whereby torque may be transmitted to said drive shaft from a traction element of the motor vehicle.

15. The combination of a power take-off and transmission mechanism with a motor vehicle of the type having an engine for driving ground engaging traction elements, said combination comprising: a constant mesh change speed transmission having a power input shaft and a variable speed output shaft, said output shaft being connected in torque transmitting relationship with the traction elements of the motor vehicle; a change speed gear mechanism including a hydraulic actuated multiple disk clutch for selectively interconnecting said input and output shafts; a hydraulic system including a pump for supplying pressurized fluid to actuate said disk clutch; a drive shaft paralleling said output shaft and having a driven gear rotatably mounted thereon; a pump shaft nonrotatably connected in coaxial relationship to said drive shaft for driving said pump; an engine driven power take-off shaft paralleling said drive shaft and having a driving gear nonrotatably mounted thereon and in constant mesh with said driven gear; a multiple disk clutch mechanism having said first set of disks nonrotatably mounted and axially slidable on said driven gear, and a second set of disks nonrotatably mounted and axially slidable on said drive shaft and being alternately stacked and frictionally engageable with said first set of disks; a collar member nonrotatably mounted and axially slidable on said drive shaft, said collar member serving as a thrust plate for axially moving said sets of clutch disks into frictional contact; pressure means acting on said collar member for maintaining said sets of clutch disks in frictional engagement whereby torque may be imparted to said drive shaft from the engine; a gear portion integral with said collar member; a driving gear member non-rotatably mounted on said output shaft and selectively engageable with said gear portion on said collar member; and actuating means for shifting said collar member in one axial direction to release said multiple disk clutch and alternatively sliding said gear portion into mesh with said driving gear member whereby torque may be imparted to said drive shaft from a traction element of the motor vehicle.

References Cited in the file of this patent

UNITED STATES PATENTS

| | | |
|---|---|---|
| 1,661,613 | Jackson | Mar. 6, 1928 |
| 2,013,126 | Bonn | Sept. 3, 1935 |
| 2,158,320 | Bock | May 16, 1939 |